C. M. RUSHING & A. J. WHEELER.
SUCTION DEVICE FOR CORN SHELLING MACHINES.
APPLICATION FILED DEC. 24, 1910.
1,015,346.
Patented Jan. 23, 1912.
2 SHEETS—SHEET 1.
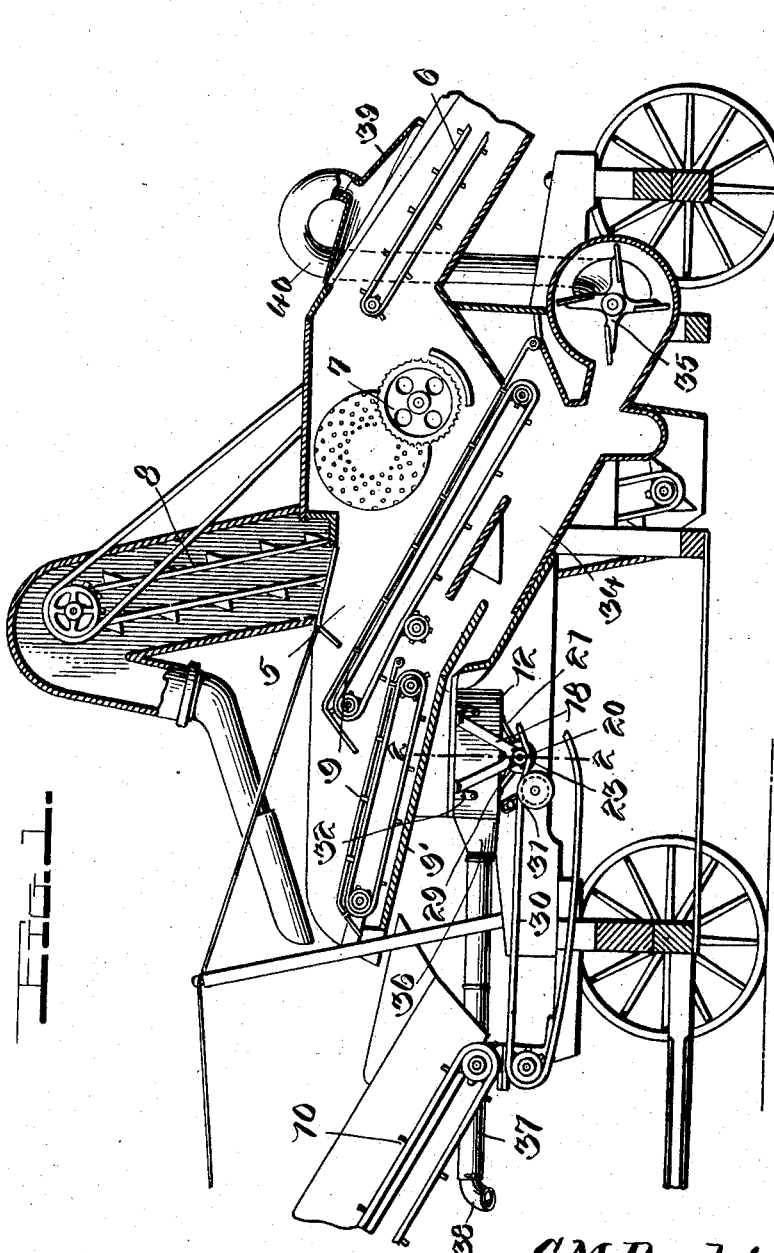
Witnesses
Chas. L. Griesbauer.
M. F. Reeder
Inventors
C. M. Rushing and
A. J. Wheeler
By Watson E. Coleman.
Attorney

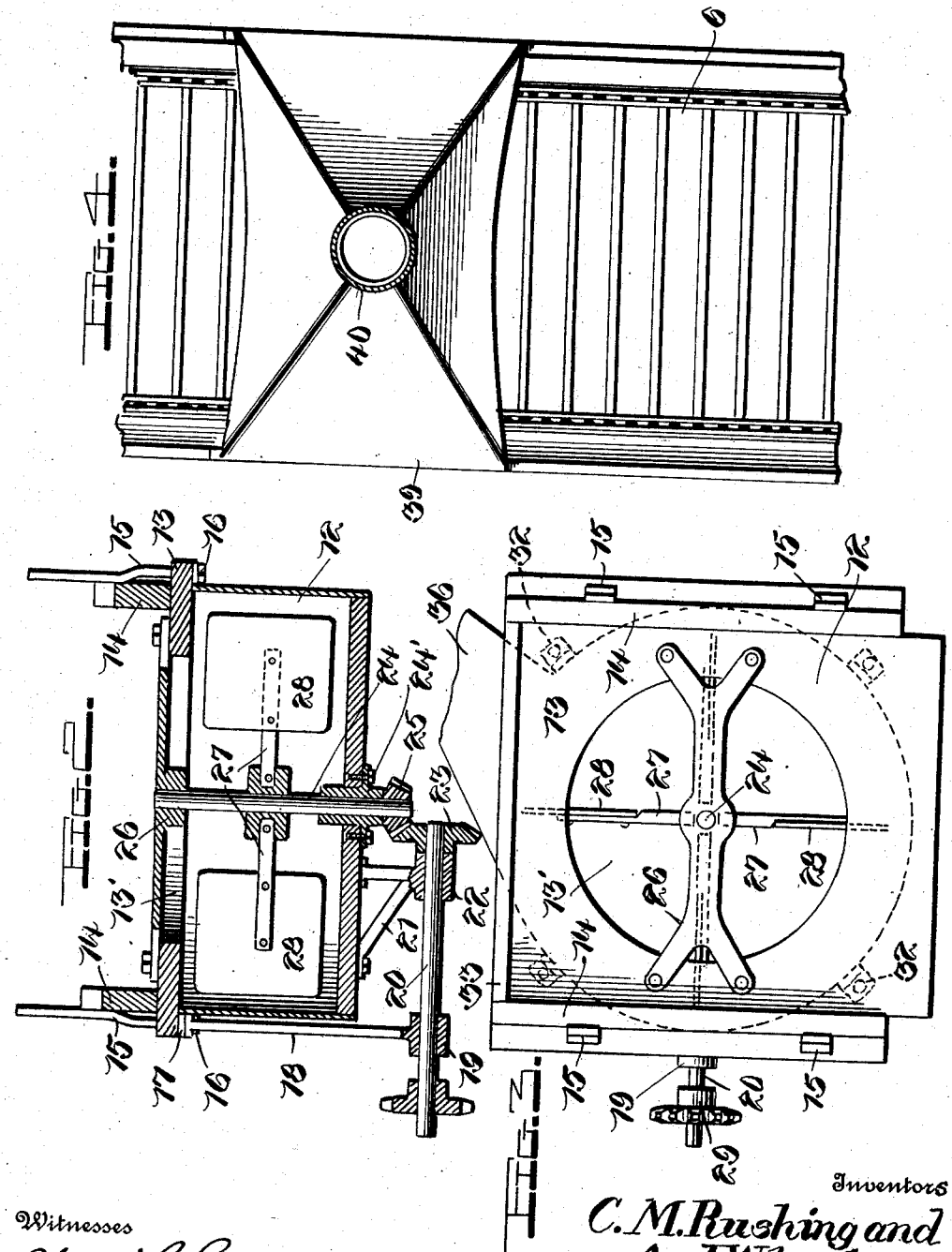

UNITED STATES PATENT OFFICE.

CLYDE M. RUSHING AND ALBERT J. WHEELER, OF CHARLESTON, MISSOURI.

SUCTION DEVICE FOR CORN-SHELLING MACHINES.

1,015,346.

Specification of Letters Patent.

Patented Jan. 23, 1912.

Application filed December 24, 1910. Serial No. 599,099.

*To all whom it may concern:*

Be it known that we, CLYDE M. RUSHING and ALBERT J. WHEELER, citizens of the United States, residing at Charleston, in the county of Mississippi and State of Missouri, have invented certain new and useful Improvements in Suction Devices for Corn-Shelling Machines, of which the following is a specification, reference being had to the accompanying drawings.

This invention relates to suction devices for corn shelling machines and has for its object to provide a very simple and efficient device of this character whereby the dust which is caused in the shelling of the corn as it passes through the machine may be concentrated and directed away from the machine.

A further object of the invention is to provide a suction dust collector for corn shelling machines whereby a portion of the dust is withdrawn from the corn as it passes into the machine to be shelled, thereby increasing the efficiency of the machine as a whole.

Still another object of the invention resides in the provision of improved means for positioning and mounting the suction device upon corn shelling machines of the present construction.

With the above and other objects in view, the invention consists of the novel features of construction, combination and arrangement of parts hereinafter fully described and claimed, and illustrated in the accompanying drawings, in which—

Figure 1 is a longitudinal section of a corn shelling machine, showing our improved suction device arranged in operative relation thereto; Fig. 2 is an enlarged section taken on the line 2—2 of Fig. 1; Fig. 3 is a top plan view of the device removed from the machine; and Fig. 4 is a top plan view of a portion of the elevator of the machine showing the dust gathering hood positioned thereon.

Referring in detail to the drawings 5 designates a corn shelling machine which may be of any approved construction and of the stationary type or portably mounted as shown in the drawing. This machine comprises broadly a feed elevator 6, the shelling mechanism 7, which is arranged in advance of the feed elevator, the conveyer 8 for the shelled corn, and the cob carriers 9 which are adapted to convey the denuded cobs to the stacker 10.

Beneath the forward cob carrier 9 our improved suction device is mounted, said device being adapted to remove the dust and chaff which has accumulated in the shelling of the corn and is carried together with the cobs to the forward end of the machine to be discharged upon the stacker 10. By arranging our invention upon the machine as disclosed in Fig. 1, all of the remaining chaff and dust is removed and the cobs thus thoroughly cleaned before being discharged from the machine. The value of the corn cobs as a fuel is thereby greatly increased.

Our improved suction device embodies in its construction, a cylindrical drum 12, the floor or bottom of which would preferably be composed of a plurality of pieces of board or timber, glued or otherwise suitably secured together to prevent the same from warping. The circumferential wall of the drum is formed from a single sheet of galvanized iron bolted or otherwise secured to the bottom of the drum. The top 13 of the drum projects at one of its ends slightly beyond this circumferential wall and upon the opposite edges of the top 13 the side pieces 14 are arranged. These side pieces are of greater width at one end than the other so that the drum may be horizontally positioned beneath the floor 9′ over which the forward cob carrier 9 moves. The drum is supported in position by means of the strap irons 15 which are cylindrically formed at one end and extended through the opposite edge portions of the top 13 of the drum. These strap irons are rigidly fastened to the inclined floor 9′ of the shelling machine and upon their lower ends the nuts 16 are threaded. A longitudinal plate 17 is arranged upon the under side of the top of the drum through which the lower ends of the strap irons 15 extend. The threaded ends of these strap irons also extend through the upper ends of the V-shaped hanger 18 which is disposed at one side of the drum 12. The lower end of this hanger carries a bearing 19 in which a shaft 20 is journaled. This shaft extends beneath the drum 12 and at its inner end is braced and supported by means of the brace member 21 which also carries a bearing 22 to receive the shaft 20. Upon the inner end of the shaft 20 a beveled gear 23 is secured. This gear engages a beveled pinion 25 which is keyed upon the lower end of the shaft 24. This shaft extends through a bearing 24' fixed to the bottom of the drum 12 and at its upper end is journaled in a casting 26 which is fixed at its opposite ends to the top 13 of the drum, said casting extending over the opening 13' in the top 13 of the drum through which the dust and chaff are drawn in the operation of the device. Upon the shaft 24 a plurality of arms 27 are rigidly fixed. These arms radiate from the shaft and each has secured thereto a fan blade 28. Upon the outer end of the shaft 20 a sprocket wheel 29 is keyed. Over this sprocket wheel the cob stacker chain 30 passes, through the medium of which the shaft 20 is rotated to transmit power to the fan shaft 24. A chain tightener 31 is preferably provided to take up the slack in the chain 30. The top 13 of the drum 12 is rigidly held in position by means of a plurality of angle braces 32 which are fixed to the under side of said top and to the wall of the drum.

The front ends of the side bars 14 are connected by the member 33 which fits closely against the under side of the floor 9' of the machine and prevents the entrance of air to the drum from this end of the device. The space between the rear ends of the side bars 14 is open and in communication with the forward end of the dust channel 34 which is usually provided in machines of this character. Part of the dust which is caused by the shelling of the corn falls below the rear cob carrier member 9 and into the fan drum mounted on the machine in which the fan 35 is arranged. This fan directs the dust and chaff into the channel 34 and in the present construction of such machines discharges the same from the forward end thereof. The discharge of the dust at this point is undesirable as it causes a continual cloud of dust around the machine which must be breathed by the operators. In the use of our device the dust is directed by the fan 35 into the drum 12. The drum is provided with a discharge spout 36 to which a metallic conducting tube 37 is connected. An elbow 38 may be fitted into the end of this tube and adjusted to direct the flow of the dust in accordance with the direction from which the wind may be blowing.

In order to withdraw a portion of the dust before the corn enters the shelling mechanism so as to facilitate the shelling operation and thoroughly denude the cobs, we provide a hood 39 which is mounted upon the sides of the frame of the feed elevator 6. The side bars of the hood gradually taper toward one end so as to incline the hood reversely to the inclination of the elevator. An air pipe 40 connects the center of the hood 39 with the drum of the fan 35, the rotation of said fan causing a powerful suction of air through the pipe 40 so that the dust is drawn into the fan drum and discharged together with the other dust accumulation caused by the shelling of the corn, into the passage 34 from whence it is carried off in the manner previously described.

From the foregoing it is believed that the construction and operation of our improved dust collecting device for use in combination with corn shelling machines will be readily understood. The construction of the same is comparatively simple and it may be easily and quickly arranged upon corn shelling machines now upon the market and in common use. The shelled corn is thoroughly cleaned and greatly improved by partially removing the dust from the corn on the cob as it enters the machine and then removing and conveying all dust entirely away from the machine after the cobs are shelled so that it will not be blown back upon the shelled corn as it is loaded into wagons or otherwise stored. Furthermore, the cobs which have been relieved of all particles of dust and chaff before they are discharged upon the stacker, are better adapted for use as a fuel and consequently of higher value.

The most important result which is obtained by the use of the device resides in the fact that the air which must be inhaled by the operator or operators is kept at all times perfectly pure and clean, thus eliminating the deleterious effects upon the health which is caused by the operators being compelled to breathe the air from a stifling cloud of dust which continually hovers about corn shelling machines when in operation.

As the device comprises but very few elements in its construction, it will be obvious that it is not liable to get out of order and require extensive repairs.

While we have shown and described the preferred construction and arrangement of the various parts, it will be understood that the device is susceptible of considerable modification without departing from the essential feature or sacrificing any of the advantages of the invention.

Having thus described the invention what is claimed is:—

1. The combination with a corn shelling machine including a feed elevator, corn shelling mechanism, and a cob carrier, of a suction device arranged beneath said carrier, said device comprising a drum into which dust from the denuded cobs on the carrier is adapted to be drawn, a fan in said drum, a discharge tube connected to the drum, a second fan carried by the machine and disposed below the plane of said suction device, a dust conducting tube connected to said casing and having its open end disposed above the elevator, said fan partially withdrawing the dust from the corn before it enters the shelling mechanism, and driving the same upwardly and into the drum of said suction device, the fan of said suction device finally expelling the dust which is first drawn from the corn and that drawn from the denuded cobs, from the machine.

2. The combination with a corn shelling machine including a feed elevator, corn shelling mechanism, and a cob carrier; of a suction device arranged beneath said carrier, said device comprising a drum, a fan mounted to rotate within said drum in a horizontal plane, a dust conducting tube connected to said drum, a second fan mounted to rotate in a vertical plane and disposed below said suction device, said latter fan partially withdrawing the dust from the corn as it enters the machine and driving the same into the drum of said suction device, from whence together with the dust drawn from the denuded cobs it is expelled from the machine.

In testimony whereof we hereunto affix our signatures in the presence of two witnesses.

CLYDE M. RUSHING.
ALBERT J. WHEELER.

Witnesses:
   THOMAS T. LINDSAY,
   M. W. MAYES.

---

Copies of this patent may be obtained for five cents each, by addressing the "Commissioner of Patents, Washington, D. C."